(12) United States Patent
Truncale et al.

(10) Patent No.: US 8,099,876 B1
(45) Date of Patent: Jan. 24, 2012

(54) AZIMUTH DETERMINATION SYSTEM AND METHOD THEREFOR

(75) Inventors: Angelo Truncale, Lake Forest, CA (US); Robert J. Atmur, Whittier, CA (US); Joseph E. Justin, Corona, CA (US); Brian Barsamian, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 733 days.

(21) Appl. No.: 12/276,056

(22) Filed: Nov. 21, 2008

(51) Int. Cl.
*G01C 19/38* (2006.01)

(52) U.S. Cl. ............................ 33/324; 33/321

(58) Field of Classification Search .............. 33/324, 33/321
See application file for complete search history.

(56) References Cited

U.S. PATENT DOCUMENTS

| | | | | |
|---|---|---|---|---|
| 3,131,292 A * | 4/1964 | Tobin, Jr | ............................ | 701/4 |
| 3,330,945 A * | 7/1967 | Gevas | ............................ | 701/4 |
| 3,415,126 A * | 12/1968 | Thomason et al. | ............ | 74/5.47 |
| 3,762,062 A * | 10/1973 | Johnston | ........................ | 33/321 |
| 4,020,491 A * | 4/1977 | Bieser et al. | .................. | 343/765 |
| 4,387,513 A * | 6/1983 | Cowdin | .......................... | 33/322 |
| 4,458,426 A | 7/1984 | O'Connor et al. | | |
| 4,582,291 A * | 4/1986 | Matthews | ...................... | 248/550 |
| 4,603,483 A * | 8/1986 | Wing | .............................. | 33/324 |
| 4,924,593 A * | 5/1990 | Renker et al. | ................... | 33/324 |
| 5,396,326 A * | 3/1995 | Knobbe et al. | ............... | 356/255 |
| 6,636,826 B1 * | 10/2003 | Abe et al. | ....................... | 702/151 |
| 7,801,704 B2 * | 9/2010 | Sato et al. | ..................... | 702/189 |
| 2010/0251557 A1 * | 10/2010 | Albo et al. | ...................... | 33/318 |

* cited by examiner

*Primary Examiner* — Christopher Fulton
(74) *Attorney, Agent, or Firm* — Weiss & Moy, P.C.

(57) ABSTRACT

An azimuth determination system has a platform. A plurality of gimbals is attached to the platform to allow the platform to rotate about multiple axes. A pair of gryos is attached to the platform. A leveling device is attached to the platform to indicate when the platform is at a desired position. A control device attached to the plurality of gimbals to move the platform to the desired position indicated by the leveling device. An electronics system is to provide power to the azimuth determination system and to determine azimuth by positioning the gyros in a first position with an input axis of the gyros in the horizontal plane and orthogonal to the Earth Rate vector to calculate a first output and rotating the gyros 180° about the vertical to a second position to calculate a second output, the platform is then inverted and an additional set of two readings is taken. The four outputs are combined to produce the azimuth value and a gyro induced bias error. The azimuth value of the autocollimator line of sight is transferred to the laboratory reference mirror.

20 Claims, 13 Drawing Sheets

AZIMUTH DETERMINATION SYSTEM AND METHOD THEREFOR

BACKGROUND

Embodiments of this disclosure relate generally to a device for determining an azimuth reference line, and more particularly, to an azimuth determination system that has improved accuracy over current gyrocompasses, and which provides an azimuth determination every few hours that is independent of the need for a pier with long term stability to hold a reference mirror.

The testing of high accuracy inertial instruments and systems, such as those used on Intercontinental. Ballistic Missile Systems or Submarine Launched Ballistic Missile Submarine Systems, generally require that an accurate azimuth reference line be available. These instruments and systems may be tested in laboratories that have access to a precision azimuth reference in the form of a mirror on a stable concrete block. The azimuth of the mirror normal is generally referenced to north using periodic "star shots" of the North Star, Polaris. Star shots are lengthy procedures that may be performed as many as 4 times per month, to as few as 4 to 8 times per year.

To provide a stable mirror reference between star shots, the mirror is mounted on massive concrete piers and often anchored to the ground through multiple pilings that may extend up to a hundred feet below the ground level. Once built it may take several years for the structure to cure and settle, only then will it be clear if the design is a success.

The option of replicating the stable-pier infrastructure in different locations is expensive. Furthermore, replicating the stable-pier infrastructure may be extremely risky based on soil conditions where the stable-pier infrastructure will be located. Furthermore, geology or geography-introduced errors may not be controlled in certain areas.

Less complicated systems using a gyrocompass have been designed to calculate an azimuth reference line. However, these types of systems generally do not have the desired accuracy of the stable-pier infrastructure system.

Therefore, it would be desirable to provide a system and method that overcomes the above problems. The system and method will improve accuracy over current gyrocompasses which have many error sources and provide an azimuth determination every few hours that is independent of the need for a long term stable pier to hold a reference mirror.

SUMMARY

An azimuth determination system has a platform. A plurality of gimbals is attached to the platform to allow the platform to rotate about multiple axes. A pair of gyros is attached to the platform. A leveling device is attached to the platform to indicate when the platform is at a desired position. A control device attached to the plurality of gimbals to move the platform to the desired position indicated by the leveling device. An electronics system is to provide power to the azimuth determination system and to determine azimuth by positioning the gyros in a first position with an input axis of the gyros in a horizontal plane and orthogonal to the Earth Rate vector to calculate a first output and rotating the gyros 180° about the vertical to a second position to calculate a second output, the platform inverted and rotated to calculate a third and fourth outputs, wherein the four outputs are combined to produce the azimuth value and gyro induced bias error.

An azimuth determination system has a rotary table and a platform. A heat exchanger is positioned between the platform and the rotary table. Proximity electronics are attached to the platform. A plurality of gimbals is attached to the platform to allow the platform to rotate about multiple axes. A pair of gryos is attached to the platform. At least one heating device is positioned on each gyro to control a temperature of each gyro. A plurality of end caps is provided, wherein one end cap is placed on each end of each gyro. A trunnion heating device is placed on each platform gimbal trunnion. A leveling device is attached to the platform to indicate when the platform is at a desired position. The leveling device has a covering to minimize thermal gradients and temperature variations. A control device is attached to the plurality of gimbals to move the platform to the desired position indicated by the leveling device. The control device comprises: a first motor to bring an inner gimbal of the plurality of gimbals to a desired position; and a second motor to move the platform to the desired position indicated by the leveling device. An electronics system is used to provide power to the azimuth determination system and to determine azimuth by positioning the gyros in a first position with an input axis of the gyros in the horizontal plane and orthogonal to the Earth Rate vector to calculate a first output and rotating the gyros 180° about the vertical to a second position to calculate a second output, the platform inverted and rotated to calculate a third and fourth outputs, wherein the four outputs are combined to produce the azimuth value and gyro induced bias error.

A gyrocompassing method to calculate azimuth free of gyro induced bias error comprising: positioning a pair of gyros in a first position with an input axis of the gyros in a horizontal plane and orthogonal to the Earth Rate vector to calculate a first output; rotating the gyros 180° about the vertical to a second position to calculate a second output; and calculating the azimuth, the azimuth equal to $\text{Sine}^{-1}(\text{First Output} - \text{Second Output})/2\omega_{ie\text{-}h}$, wherein $\omega_{ie\text{-}h}$ is the horizontal component of earth rate.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Gyrocompass systems have been designed to calculate an azimuth reference line. However, these gyrocompass systems generally do not have the desired accuracy of the stable-pier infrastructure system due to gyroscopic induced bias and the inability to control certain operating parameters as will be discussed below.

Figure 1:
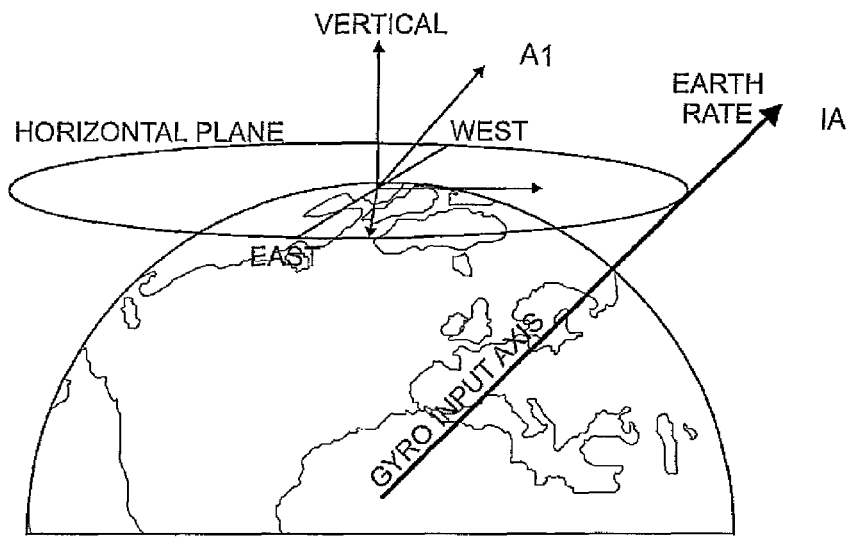
FIG. 1 is a simplified diagram showing Earth rate horizontal and vertical vector components and gyro input axis.

Referring to FIG. 1, gyroscopic induced bias will be discussed. The Earth's rotation about its axis A1 is approximately 15°/hr or more accurately, 7.292115090×10-5 rads/s. A gyroscope is a device that measures components of angular rate about its input axis; i.e., if the input axis IA is pointed parallel to the earth's axis the gyroscope output will indicate the 15°/hr rate above plus a gyroscope induced "bias" error which is summed with the gyroscope output. If the gyroscope input axis is pointing orthogonal to the polar axis it will read roughly zero. In FIG. 1, the polar rotation vector can be resolved into components along various other axes, in the present embodiment, those along the local horizontal axis and the local vertical axis. The East/West line is orthogonal to the Earth Rate vector so an input axis pointing east will measure roughly zero, or if it is in the horizontal plane but off of east by an angle $\phi$, it will measure (bias+$\omega_{ie\text{-}h}$ sine $\phi$). To determine $\phi$ free of bias, the gyrocompass is rotated exactly 180° about the vertical and again the output value measured. In this case the value will be (bias −$\omega_{ie\text{-}h}$ sine $\phi$). With these two measurements, values of bias and $\phi$ are extracted:

GYRO OUTPUT EAST=BIAS+$\omega_{ie\text{-}h}$ Sin $\phi$ (1)

GYRO OUTPUT WEST=BIAS−$\omega_{ie\text{-}h}$ Sin $\phi$ (2)

BIAS=(Equ 1+Equ 2)/2,
$\phi$=Sine$^{-1}$(Equ 1−Equ 2)/2$\omega_{ie\text{-}h}$
Must rotate exactly 180 degrees and exactly about the vertical Wherein Equ 1 and Equ 2 are the gyro output east and gyro output west respectively.

Any errors in rotating the gyrocompass exactly 180°, or if not rotating about the exact vertical axis, will result in errors in the extracted value of azimuth. Furthermore, to achieve the desired azimuth accuracies certain parameters need to be achieved. These parameters include, but are not limited to: temperature control, power supply stability, leveling loop accuracy and stability, table rotational accuracy, platform compliance, and rotation axis orthogonality.

Figure 2:
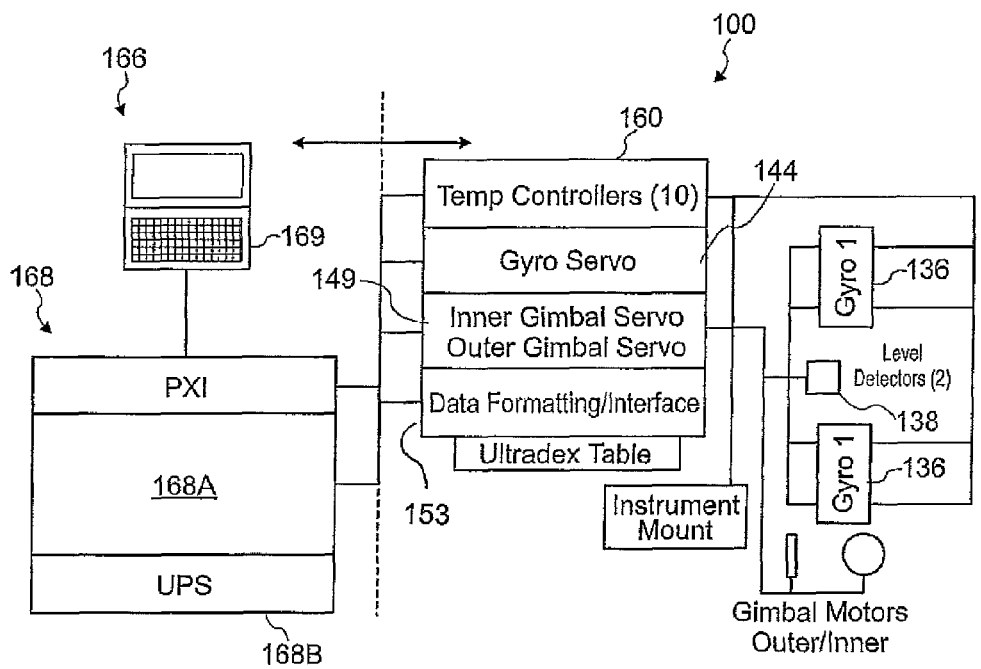
FIG. 2 is a simplified block diagram showing some of the components of the azimuth determination system.
Figure 3:
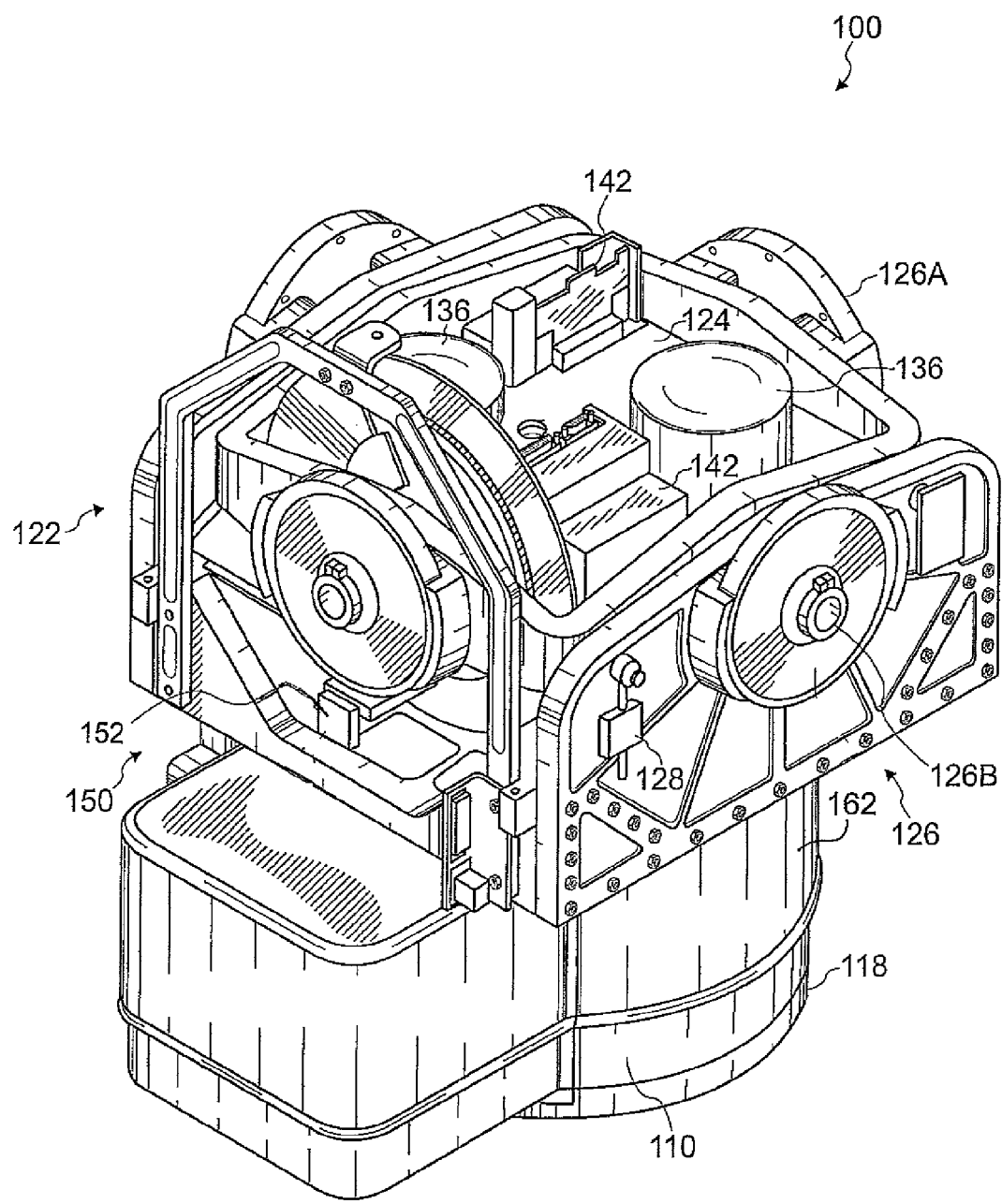
FIG. 3 is a perspective view of the azimuth determination system.

Referring to FIGS. 2 and 3, an azimuth determination system 100 (hereinafter system 100) is shown. The system 100 simplifies prior art designs which require a stable-pier infrastructure to hold a reference mirror while providing greater accuracy then prior art gyroscopic systems. The system 100 allows one to locate the direction of east while reducing gyroscopic induced bias. The system 100 uses a plurality of gyros and level detectors and locates east by performing a 4-position gyrocompassing technique, determining an azimuth value, and transferring that value to the autocollimator 170 line of sight. The azimuth determination is extremely accurate, with minimum gyroscopic induced bias.

The system 100 controls the above identified operating parameters by: 1) alignment of the different components by tight tolerances of mechanical interfaces and assembly techniques, and 2) temperature control of the instruments through care in controlling the conductive paths and minimizing the convective heat paths. System 100 keeps electronic noise to a minimum by assuring that cables that carry sensitive signals do not change position as the platform is reoriented.

Referring now FIGS. 2 and 3, the system 100 includes a precision rotary table 110 with rotation axis vertical on which is mounted a two axis gimbal system 125. A platform 124 holds a pair of gyros 136 and a platform leveling system 150. Proximity electronics 142 are also mounted on the gimbal system 125. The proximity electronics 142 contain the gyro servo 144 and gimbal servo 149 electronics, thermal controllers 160, and the signal conditioning and transmitting circuits 153 that get data to the electronics rack 166. The components of the system 100 will be described in more detail below.

The system 100 may have an electronics rack 166 coupled thereto. The electronics rack 166 may be used to provide power to the inertial instruments, provide excitations, "translate" communication protocols, process operator commands, and collect and analyze test data. The electronics rack 166 may be adapted for testing of a wide variety of inertial instruments, by adding modules as required to generate required excitation waveforms, timing synchronization, etc.

The electronics rack 166 may have a plurality of power supplies 168. The power supplies 168 may be used to power the different components of the system 100 and provide excitations. In accordance with one embodiment, the electronic rack 166 houses linear power supplies 168A. Linear power supplies 168A may be used in order to eliminate noise associated with switching DC supplies.

The electronic rack 166 may further house an Uninterruptable Power Supply (UPS) 168B. The UPS 168B may be used to ensure that a continuous supply of electric power is connected to the system 100 if the linear power supplies 168A fail. The UPS 168B assures that any short term transients or brown outs on the commercial AC will not impact testing, and in the event of a total loss will permit the system 100 to gradually power down so as to not damage any components of the system 100.

The electronic rack 166 may further house a computer system 169. The computer system 169 may be used to "translate" communication protocols, process operator commands, and collect and analyze test data.

The system 100 may have a rotary table 110. The rotary table 110 may have unlimited rotational freedom about a vertical axis. In accordance with one embodiment, the rotary table 110 may be limited to ±90'. Limiting rotation of the rotary table 110 to ±90' allows the use of direct cabling, rather than slip rings or other means to get power and signals to components on a platform 124 of the system.

As shown in FIGS. 2 and 3, a multiple axis test table 122 is attached to the rotary table 110. The test table 122 may have a platform 124 and a plurality of gimbals 126 attached to the platform 124. The gimbals 126 maintain alignment of the platform axes. The gimbals 126 may have a low starting torque and run requirements. In accordance with one embodiment, the gimbals 126 may comprise an inner gimbal 126A and an outer gimbal 126B. The inner gimbal 126A provides a means to level the platform 124 by moving relative to the outer gimbal 126B. In accordance with one embodiment, the inner gimbal 126A provides a means to level the platform 124 by moving relative to the outer gimbal 126B ±1°. This may be done by a platform leveling mechanism 150 which will be discussed below. In general, the platform leveling mechanism 150 may use a motor 130 and anti-backlash gears to allow the platform 124 to rotate 180° relative to the inner gimbal 126A. Fine adjustment of the platform 124 is made through the use of the motor 128.

Figure 4A:
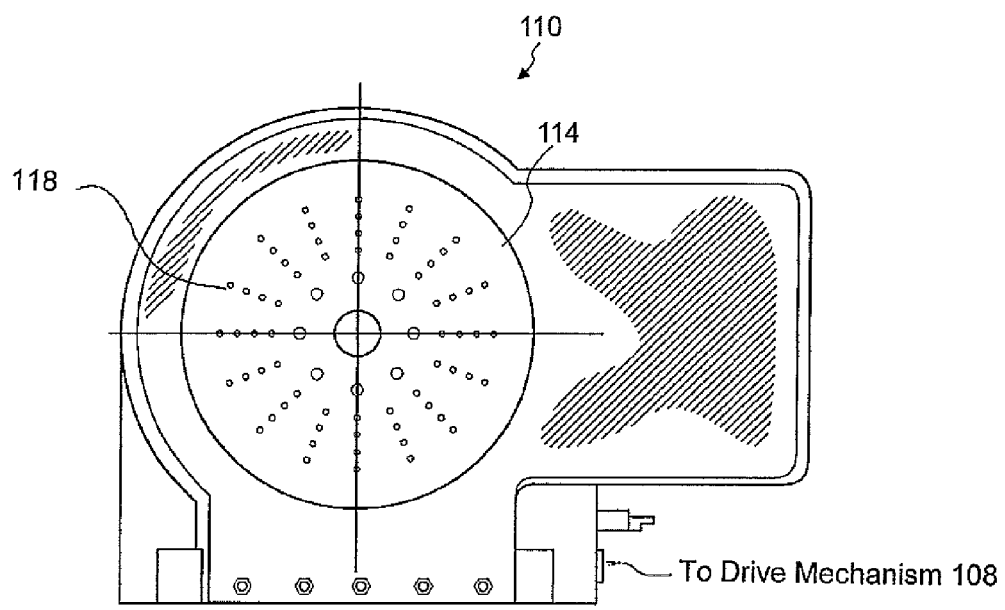
FIG. 4A is a side view of the rotary table of the azimuth determination system.
Figure 4B:
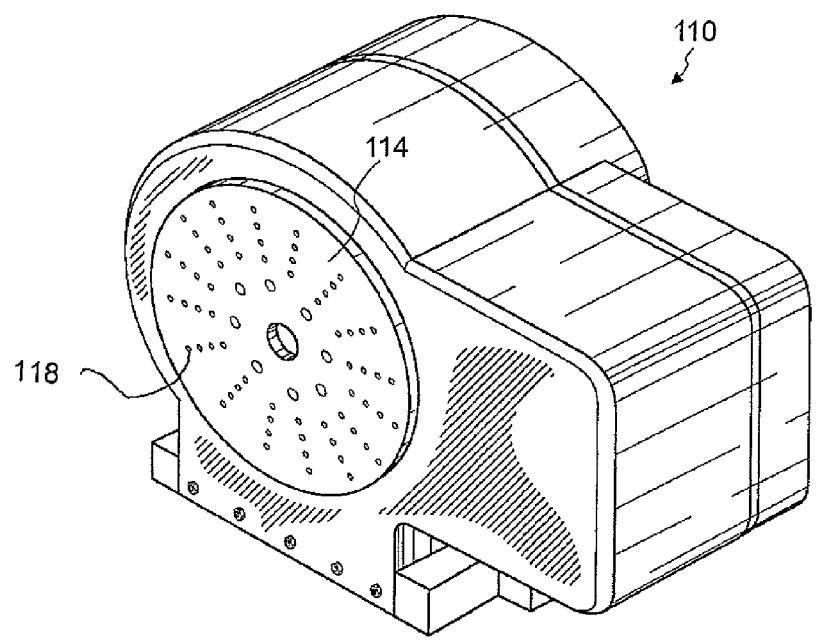
FIG. 4B is a angled side view of the rotary table of the azimuth determination system.

Referring now to FIGS. 4A-4B, more detailed views of the rotary table 110 are shown. In accordance with one embodiment, the rotary table 110 may have a faceplate 114 and bearing race assemblies 116 attached to a bottom surface of the faceplate 114. The faceplate 114 may be a hardened metallic faceplate to provide stability to the system 100. The faceplate 114 may have a plurality of mounting holes 118. The test table 122 (FIG. 3) is attached to the faceplate 114 of the rotary table 110 via the plurality of mounting holes 118.

The rotary table 110 may have a drive mechanism 108. The drive mechanism 108 is used to rotate the rotary table 110. The drive mechanism 108 may also be designed to eliminate any side loading of the bearing race assemblies 116.

Figure 5:
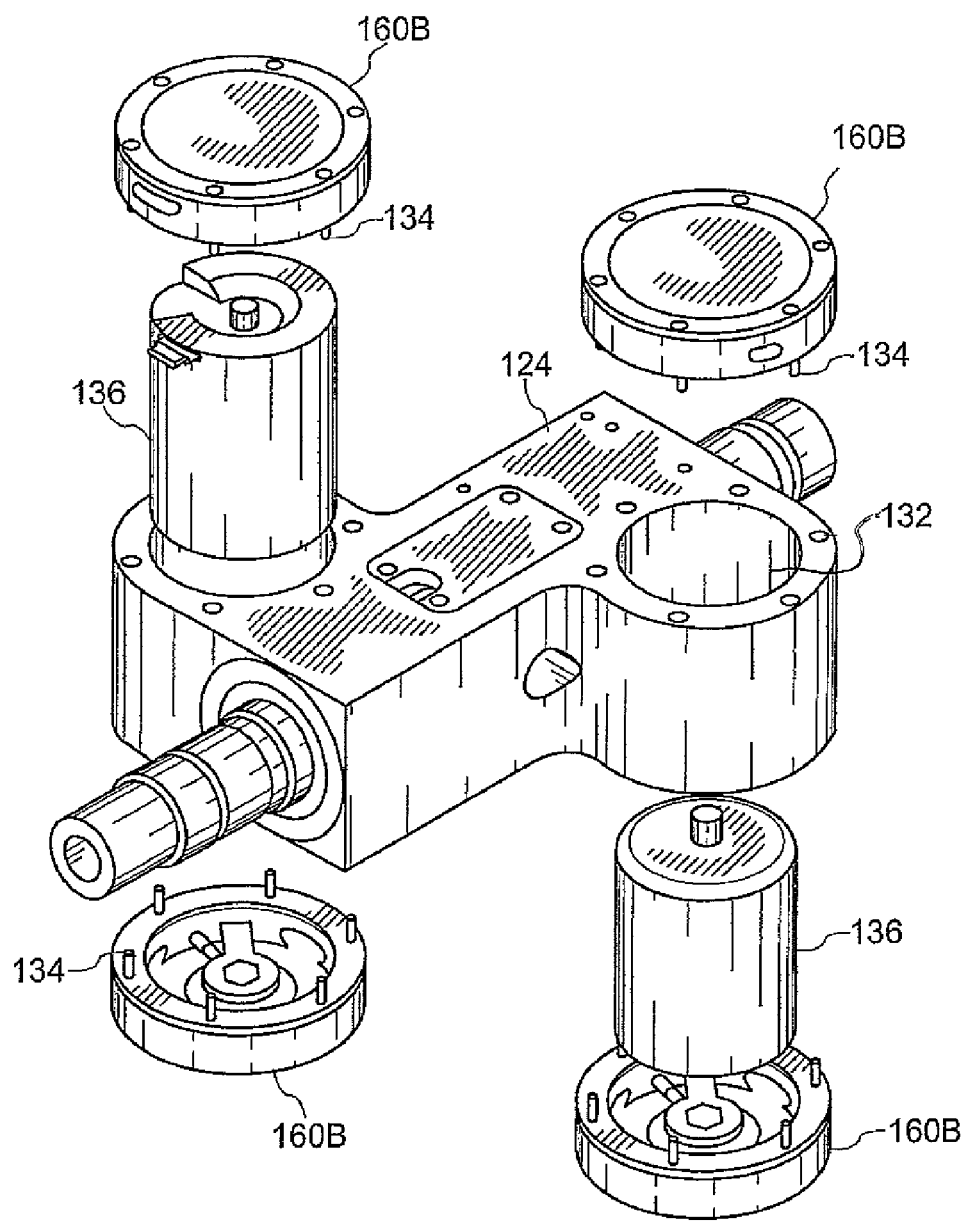
FIG. 5 is an exploded perspective view of the platform and gyro mounting of the azimuth determination system.
Figure 6:
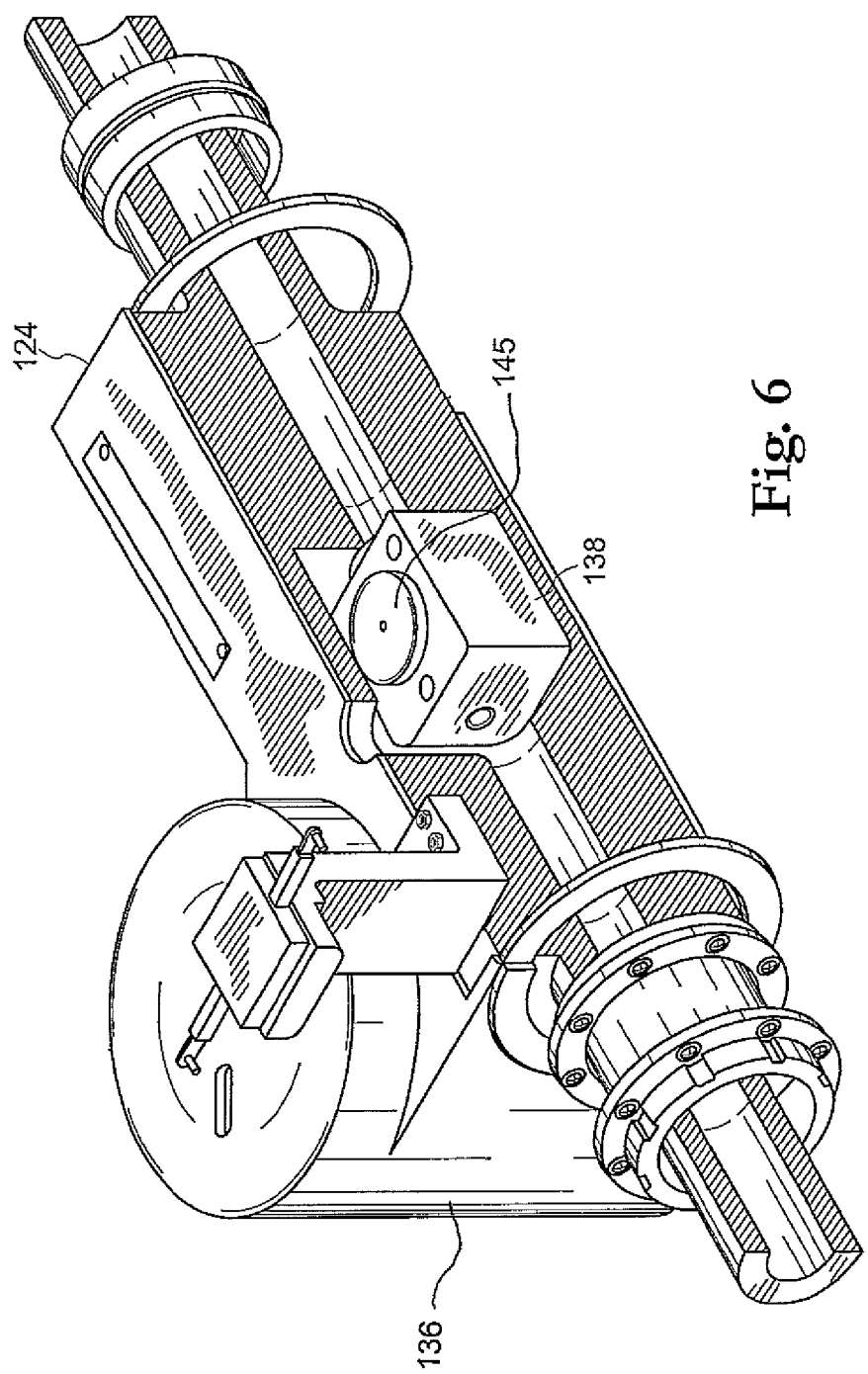
FIG. 6 is a cross-sectional view of the platform showing the bubble level assembly.

Referring now to FIGS. 5-6 more detailed views of the platform 124 are shown. An alignment device 138 is positioned on the platform 124. In accordance with one embodiment, the alignment device 138 contains a pair of bubble levels 145 mounted in a mirror block. The bubble levels 145 may be two axis bubble levels one with axis pointed up and the other with axes pointing down. The bubble levels 145 may be used to locate and servo the platform 124 to the vertical, meeting the "rotate exactly about the vertical" requirement. In accordance with one embodiment, the bubble level scale factor may be approximately 2.5 my/arc-second with a dynamic range of ±1200 arc seconds and may be excited with a 32 kHz excitation. Electrodes may be arranged in a bridge, resulting in an output signal proportional to the vertical offset.

The platform 124 may have a plurality of gyros 136 mounted thereon. The platform 124 may have a plurality of openings 132 formed there through. The openings 132 allow the gyros 136 to be mounted in the platform 124. Different devices may be used to secure the gyros 136 in the platform 124. In accordance with one embodiment, end caps 160B may be used to secure the gyros 136 in the platform 124. The end caps 160B may be secured to the platform 124 by a plurality of connectors 134.

In the embodiment shown in the FIGS. 2-3 and FIGS. 5-6, a pair of gyros 136 may be used. The gyros 136 may be a MMIII GI-TI-B type gyro. Using a pair of gyros 136 reduces uncertainty and helps to eliminate gyroscopic induced bias as disclosed above. The gyros 136 measure the value of earth rate required to determine the azimuth direction.

Figure 7:
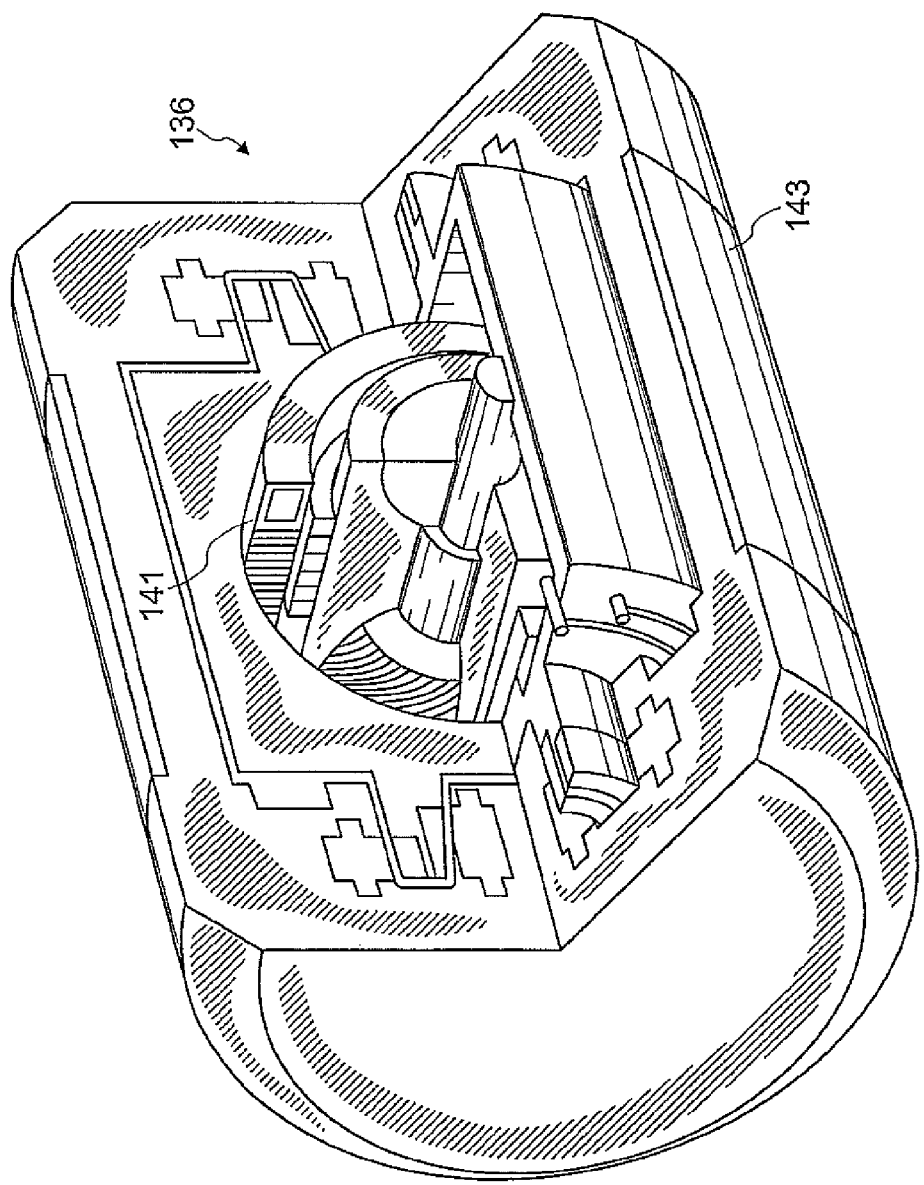
FIG. 7 is a cut away view of the gyro used in the azimuth determination system.

Referring now to FIG. 7, in accordance with one embodiment, the gyros 136 used may be a single degree of freedom gyro. In this design the rotating gyro wheel 141 is housed in a "float". The float is encased in a housing 143 surrounded by fluid that is controlled to a temperature that makes the float neutrally buoyant in the fluid. The float is constrained to only rotate about its "output" axis by a pivot and jewel mechanization. Any rate about the gyro "input" axis introduces a torque about the output axis, which is proportional to the sensed rate.

An external servo loop 144 (FIG. 2) may be coupled to the gyros 136 to monitor output axis position sensed by the "signal generator" and to introduce a current into the "torque generator" that maintains the signal generator signal at zero or "null". The value of the current is the desired information since it is proportional to the rate being sensed by the gyro input axis.

Referring back to FIGS. 2-3, proximity electronics 142 may be mounted next to different components of the system 100. In accordance with one embodiment, proximity electronics 142 may be mounted with those sensitive components which cannot tolerate noise and/or other detrimental effects that might occur to signals as they go from the components of the system 100 to an electronics rack 166 connected to the system 100. The support rack 166 may be 15 feet away or more. In the present embodiment, the proximity electronics 142 contain the gyro servo 144 and gimbal servo 149 electronics, thermal controllers 160, and the signal conditioning and transmitting circuits 153 that get data to the electronics rack 166.

The platform leveling system 150 may be connected to the platform 124. The platform leveling system 150 may be used to achieve the desired 0.01 arc second positioning accuracy. The platform leveling system 150 may allow a 180 degree platform 124 rotation.

Figure 8:
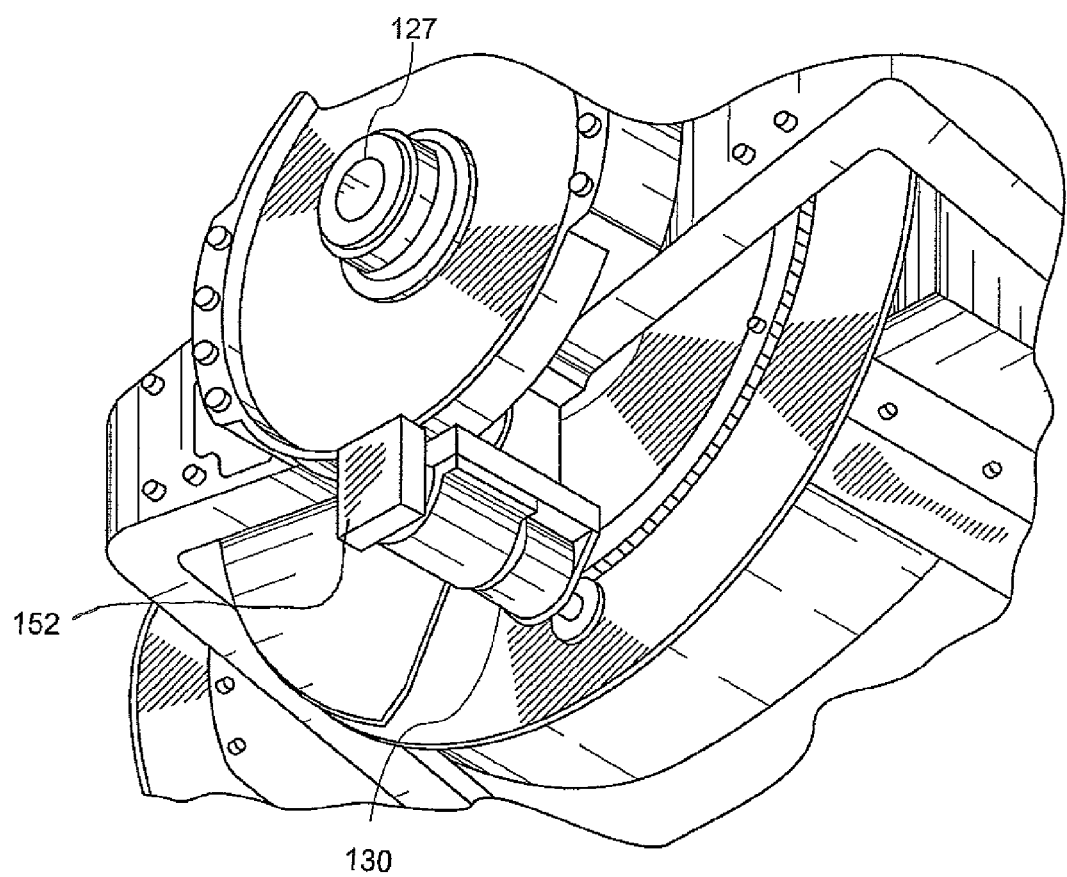
FIG. 8 is a magnified view of the azimuth determination system showing the course motor location.
Figure 9:
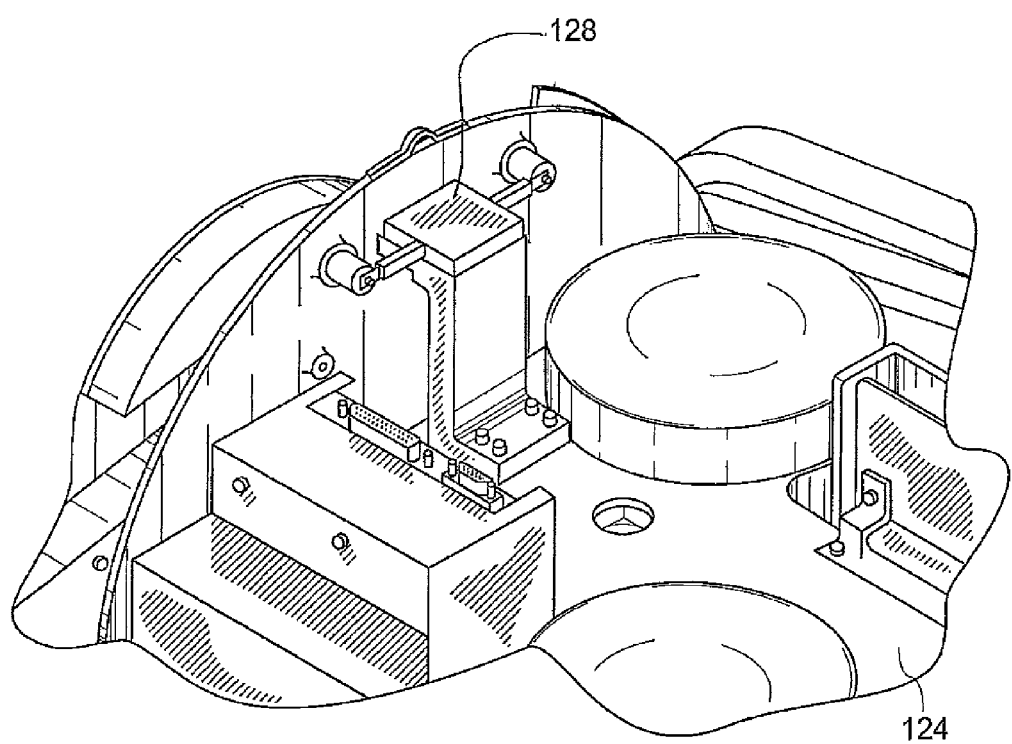
FIG. 9 is another magnified view of the azimuth determination system showing fine motor location.

Referring now to FIGS. 8-9, the platform leveling system 150 may use the motor 130 to allow the platform 124 to rotate 180° relative to the inner gimbal 126A. Fine adjustment of the platform 124 is made through the use of the motor 128.

In accordance with one embodiment, the motor 130 is mechanized to allow the platform to rotate 180 degrees. The motor 130 may have a resolver 152 coupled thereto. The resolver 152 provides position feedback. The function of the motor 130 is to bring the inner gimbal 126A (FIG. 2) to the desired position within 0.1 degrees. The motor 130 may be a stepping motor or the like. A stepper motor is a brushless, synchronous electric motor that can divide a full rotation into a large number of steps. The position of the stepper motor can be controlled precisely, without any feedback mechanism.

Once the motor 130 brings the inner gimbal 126A (FIG. 2) to the desired position (i.e., within 0.1 degrees), the motor 128 may be used to servo the platform 124 (FIG. 2) to the bubble level 145 (FIG. 6). In accordance with one embodiment, the motor 128 is a piezo motor. In accordance with one embodiment, the piezo motor may have very compact dimensions and high force a maximum linear velocity of 500 mm/s, acceleration to 15 g and minimum incremental motion of 0.05 µm. In an open loop mode this is equivalent to 0.1 arc-sec and 0.01 arcsec closed loop. It is self-locking to 6 Newtons, and generates no electromagnetic fields.

In accordance with one embodiment, the platform 124 is connected to the motor 128 and the drive arm of the motor 128 via disc 158. The inner gimbal 126A (FIG. 2) through the motor 130 and its gear (anti backlash), is only attached to the platform 124 through the motor 128 and a bearing between the two.

Figure 10:
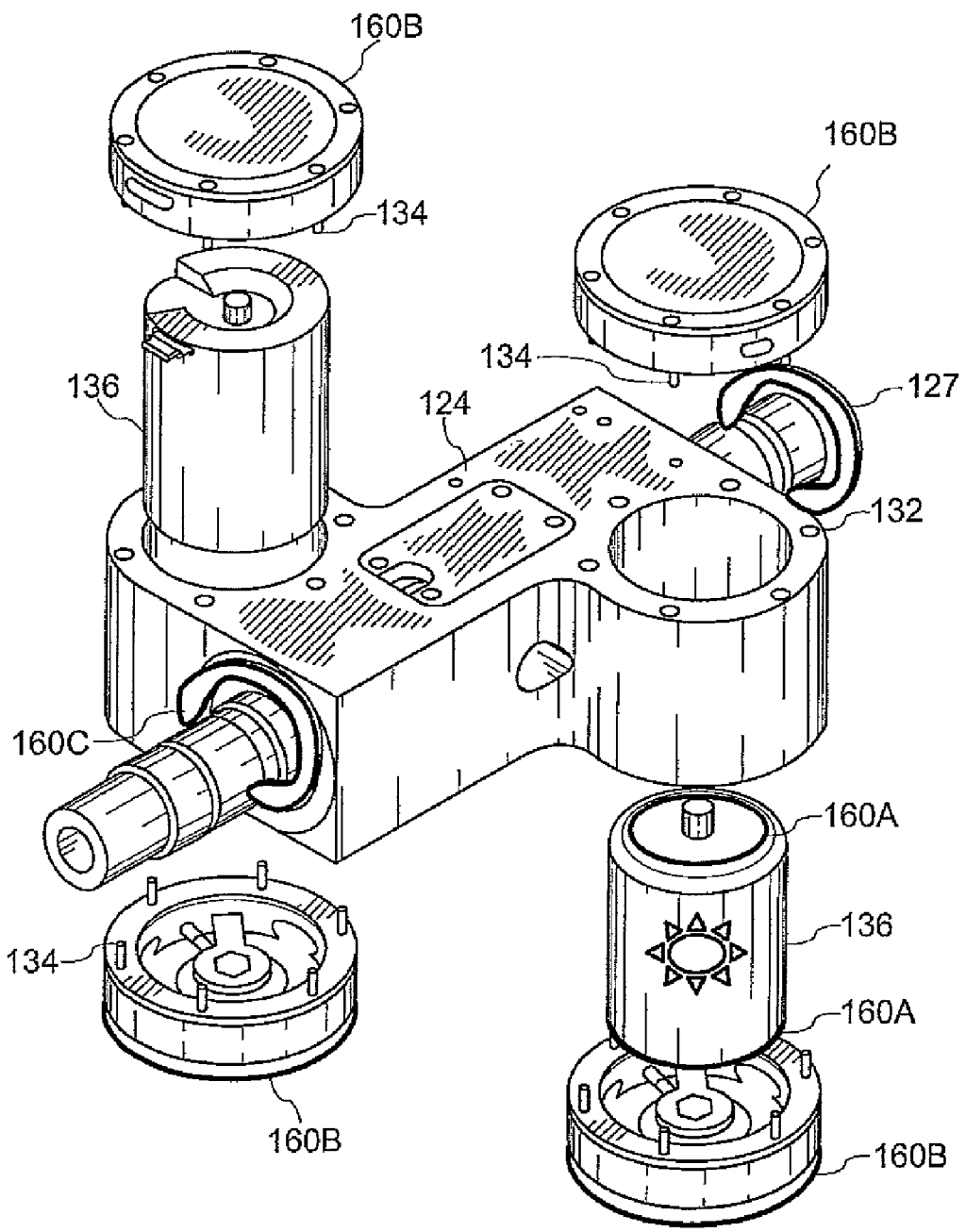
FIG. 10 is a an exploded perspective view of the platform and gyro showing thermal controller locations.

Referring now to FIGS. 2 and 10, it may be important to define and control thermal conductive paths, while minimizing convective paths as inertial instruments are very sensitive to temperature. Thus, excellent thermal management of the system 100 may be required. For this reason, the system 100 may have a plurality of thermal controllers 160. The thermal controllers 160 are placed on the platform 124 to assure that inertial instruments of the system 100 that are sensitive to temperature are controlled to within a predefined temperature range.

In general, one should define and control thermal conductive paths, while minimizing convective paths. In accordance with one embodiment, the thermal path is from the gyros 136, through the end of the gyros 136 and through the platform 124 to the trunnions 127 (i.e., mounting and/or pivoting points) of the platform 124.

In order to control thermal conductive paths, while minimizing convective paths, the thermal controllers 160 are used in a plurality of different locations in the system 100. As shown in FIG. 10, in accordance with one embodiment, the thermal controllers 160 are used to assure that the gyros 136 are controlled to a specified temperature range. In accordance with one embodiment, the thermal controllers 160 are used to assure that the gyros 136 to better than 0.005° F.

The thermal controllers 160 may be heating devices 160A designed into each end of each gyros 136 to control the temperature of the gyros 136. The thermal controllers 160 may further comprise end caps 160B placed on each end of each gyro 136. The end caps 160B insulate the ends of the gyros 136 and help to secure the gyros 136 to the platform 124. The end caps 160B may be needed as the thermal path may be from the gyros 136, through the ends of the gyros 136. The thermal path may further be from the gyro 136, through the end of the gyros 136 through the platform 124 to the trunnions 127, the thermal controllers 160 may include additional heating devices 160C placed on the platform gimbal trunnions 127. For additional thermal control, the entire inner gimbal 126A may be covered in insulating foam.

Figure 11:
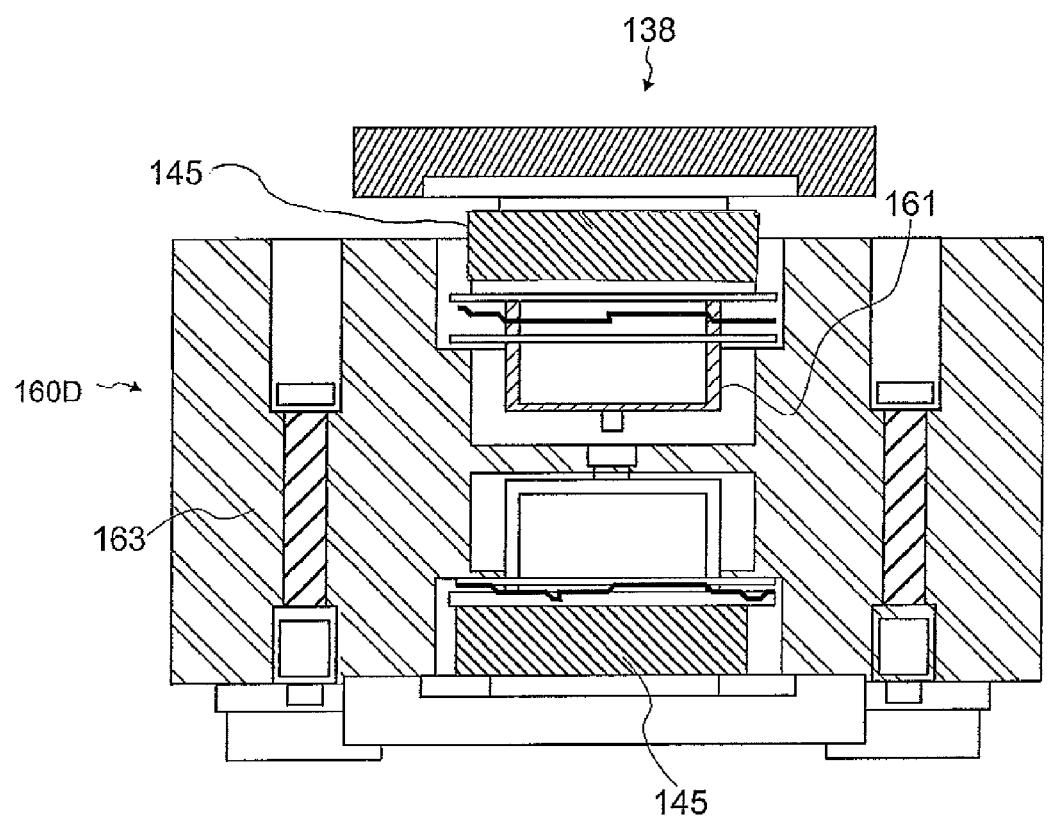
FIG. 11 is a cross-sectional view of the bubble level showing thermal isolation.

In accordance with the embodiment shown in FIG. 11, thermal controllers 160 may be a material 160D minimize thermal gradients and temperature variations. In accordance with one embodiment, the bubble levels 145 may be surrounded in a coating 161 to mitigate gradients. In accordance with one embodiment, the coating 161 is copper or a material having like properties. The bubble levels 145 may further be imbedded in a material 163 which has a high thermal conductivity and also mitigates the formation of temperature gradients. In accordance with one embodiment, the material 163 is beryllium or a material having like properties.

Figure 12:
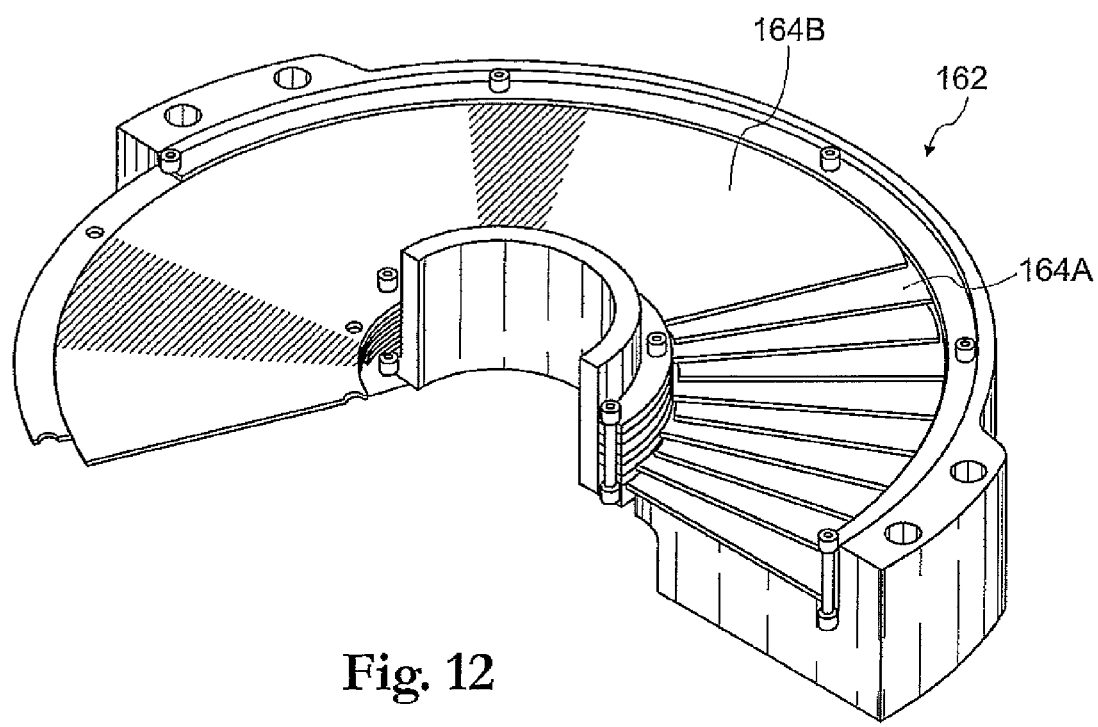
FIG. 12 is a partial view of the non-contact, rotary heat exchanger of the azimuth determination system.

Referring now to FIGS. 3 and 12, depending on the room temperature, the platform power may vary roughly between 25 and 100 watts. Thus, power may need to be dissipated from the platform 124 to the rotary table 110 which is considered the thermal sink. In accordance with one embodiment, a rotary, non-contact thermal heat exchanger 162 is placed between the platform 124 and the rotary table 110.

In the embodiment shown, the exchanger 162 is made up of two sets of disks 164A and 164B. The disks 164A and 164B are mounted alternately between an inner hub 165 that attaches to the trunnions 127 (hot) and an outer hub 169 that attaches to the inner gimbal 126A (cold). In accordance with embodiment, the disks 164A and 164B are each 0.040 inch thick. Because the separation between disks is only 0.010 inches, heat is conducted from the hot disks 164A to the cold disks 164B via conduction through the air. In accordance with one embodiment, the exchanger 162 may transfer approximately 35 watts for a 20 degree F. delta. Since an air gap of 0.010 inches cannot support convection, the thermal transfer is constant without g sensitivity. The exchanger 162 is simple, easily implemented and does not require any active components such as would be the case with thermal electric coolers, with their associated wiring, DC supplies and sizable currents.

Figure 13:
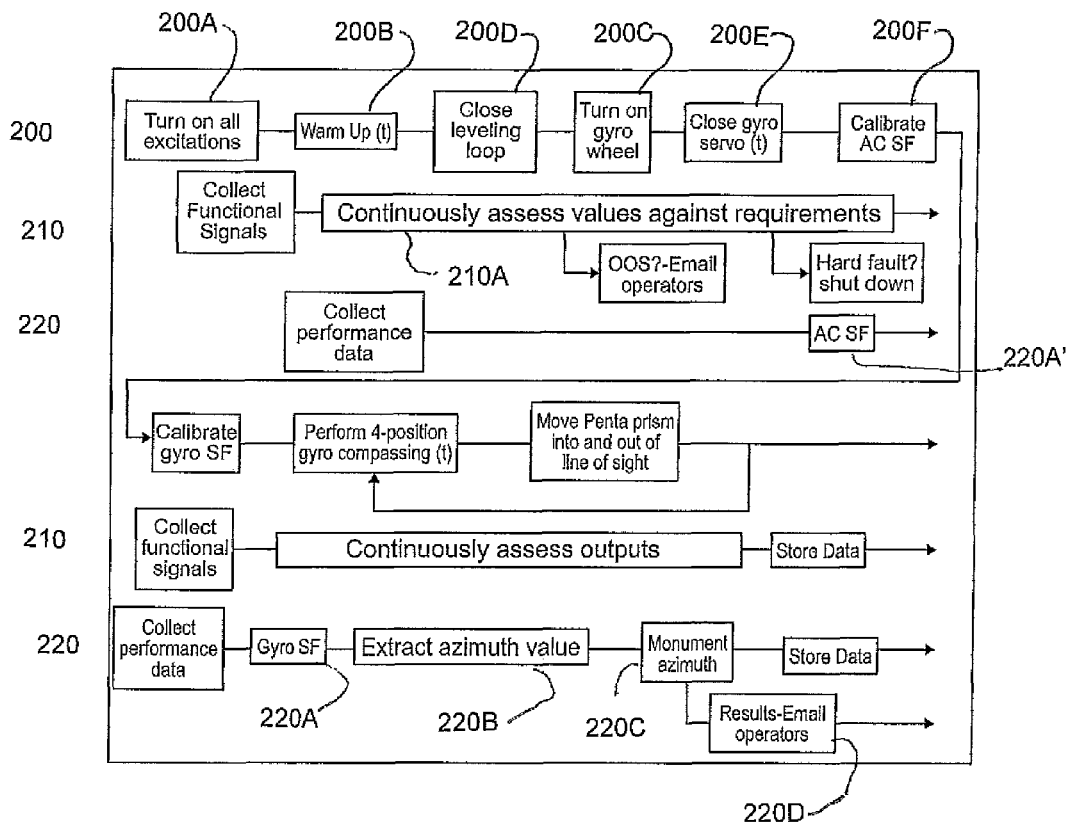
FIG. 13 is a flowchart showing operation of the azimuth determination system.

Referring now to FIG. 13, a sequence of operation of the computer system 169 is shown. FIG. 13 shows multiple processes. The flow chart line 200 shows the sequence of test functions, the flow chart lines 210 the collection of functional data (temperatures, power, etc), the flow chart lines 220 the collection of performance data (gyro torque, autocollimator, bubble level). The functional data is continuously monitored 210A to assess the health of the system 100, the collection of performance data in lines 220 is used to calculate performance parameters such as gyro/autocollimator scale factors 220A and 220A', azimuth heading 220B, 220C, etc. Periodically, test stake holders are emailed 220D with the results, and if so desired, status and results can be observed real time on remote computers.

As shown in FIG. 13, the turn on sequence includes turning on the AC and DC power supplies 200A, setting voltages and current limits, performing the power turn on sequence to the various instrument functions on the test table. These include turning on thermal controllers 160, waiting for warm up to a particular temperature 220B and then continuing with the turn on of gyro wheels 200C, closing the gyro and leveling loops 200E, 200D and initiating the functional and performance data collection. Once at operating temperature, the software initiates the test sequence, continuously monitoring and recording performance data from the gyros 136, bubble levels 145, and autocollimator 170. Functional data that track the health of the system are also continuously monitored and the values recorded compared to preset limits. If these limits are exceeded, an email is automatically sent to the responsible party. If the observed behavior is indicative of a major fault, the system 100 is shut down gracefully; thermal controllers 160 and gyro wheels 141 first, followed by all other excitations.

The collection of functional data sequence begins with a calibration of the individual gyro scale factors 220E. The 4-position sequence 220F that follows is repeated for a plurality of cycles. As stated above, the system 100 determines azimuth by positioning the gyros 136 and collecting data with the gyro sensitive axis (Input Axis) east, and then with the input axis west. Combining the east and west data permits one to extract the azimuth angle free of the gyro bias error.

Figure 14:
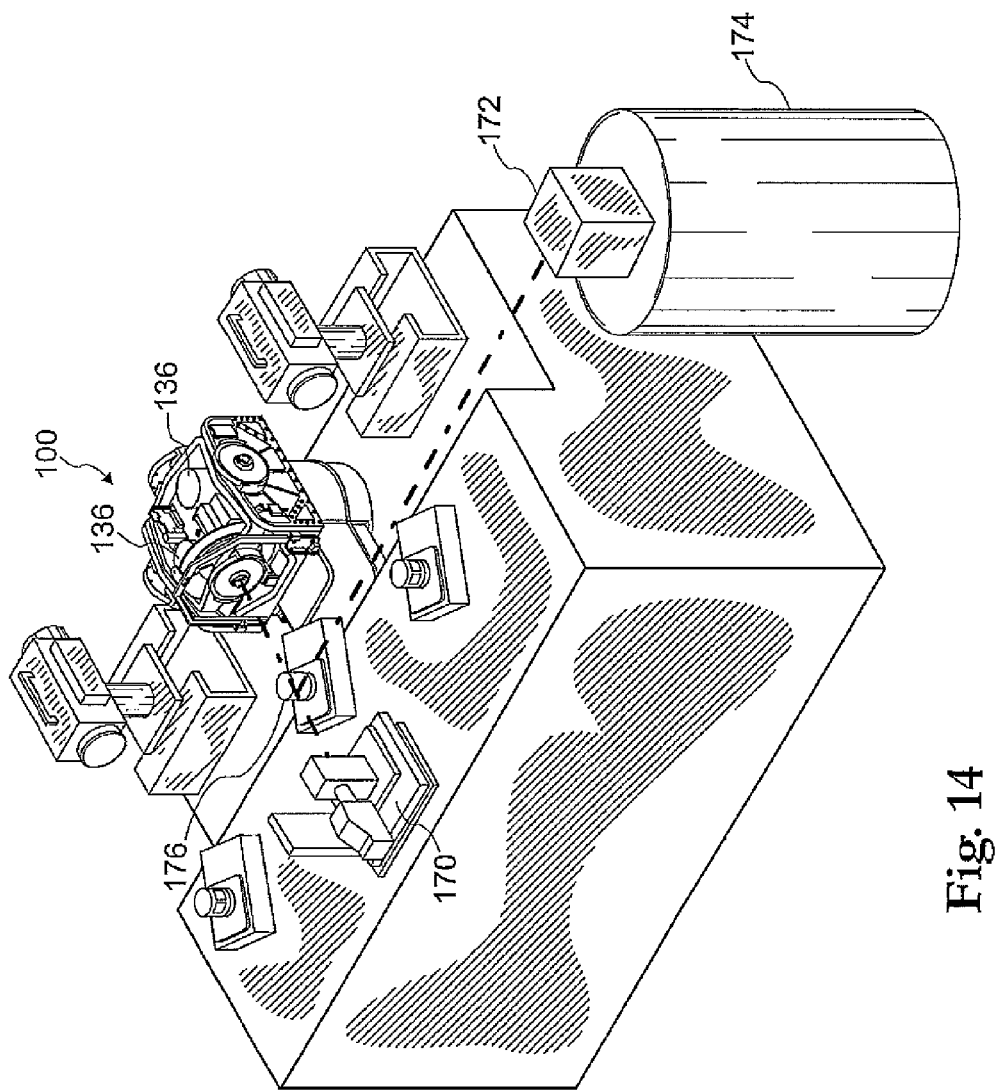
FIG. 14 shows the azimuth determination system in a test laboratory.

Referring to FIG. 14, the system 100 may use an autocollimator 170. An autocollimator 170 is an optical instrument for non-contact measurement of angles. The autocollimator 170 works by projecting an image onto a target mirror, and measuring the deflection of the returned image against a scale, either visually or by means of an electronic detector. With values for IA (FIG. 1) position with gyros 136 up/down/east and west, various errors associated with the process are eliminated and the angle of east relative to the autocollimators line of view can be analytically determined. Using a penta-reflector 176, a device that reflects the AC light beam exactly 90 deg, this angle is then transferred to the laboratory reference mirror 172, which is accessible from each of the laboratory test stations. If, for whatever reason the reference mirror 172 moves the ADS determines the amount of movement and keeps the various users apprised of the changes, via automatic emails.

While embodiments of the disclosure have been described in terms of various specific embodiments, those skilled in the art will recognize that the embodiments of the disclosure can be practiced with modifications within the spirit and scope of the claims.

What is claimed is:

1. An azimuth determination system comprising:
   a platform;
   a plurality of gimbals attached to the platform to allow the platform to rotate about multiple axes;
   a pair of gryos attached to the platform;
   a leveling device attached to the platform to indicate when the platform is at a desired position;
   a control device attached to the plurality of gimbals to move the platform to the desired position indicated by the leveling device; and
   an electronics system to provide power to the azimuth determination system and to determine azimuth by positioning the gyros in a first position with an input axis of the gyros orthogonal to the Earth Rate vector to calculate a first output and rotating the gyros 180° about the vertical to a second position to calculate a second output, the platform inverted and rotated to calculate a third and fourth outputs, wherein the four outputs are combined to produce the azimuth value and gyro induced bias error.

2. An azimuth determination system in accordance with claim 1 further comprising a rotary table attached to the platform.

3. An azimuth determination system in accordance with claim 2 further comprising a heat exchanger positioned between the platform and the rotary table.

4. An azimuth determination system in accordance with claim 3 wherein the heat exchanger comprises:
- a first set of disks; and
- a second set of disks, wherein the first set of disks and the second set of disks are mounted alternately between an inner hub and an outer hub.

5. An azimuth determination system in accordance with claim further comprising a rotary table attached to the platform, the rotary table limited to rotating approximately ±90° to reduce noise.

6. An azimuth determination system in accordance with claim further comprising proximity electronics attached to the platform.

7. An azimuth determination system in accordance with claim 1 wherein the control device comprises:
- a first motor to bring an inner gimbal of the plurality of gimbals to a desired position; and
- a second motor to move the platform to the desired position indicated by the leveling device.

8. An azimuth determination system in accordance with claim 7 wherein the first motor is a stepper motor and the second motor is a piezo motor.

9. An azimuth determination system in accordance with claim 1 further comprising a plurality of thermal controllers to control a temperature of the system.

10. An azimuth determination system in accordance with claim 1 further comprising at least one heating device positioned on each gyro to control a temperature of each gyro.

11. An azimuth determination system in accordance with claim 1 further comprising an end cap placed on each end of each gyro to insulate each end of each gyro and to secure each end of each gyro to the platform.

12. An azimuth determination system in accordance with claim 1 further comprising a trunnion heating device placed on each platform gimbal trunnion.

13. An azimuth determination system in accordance with claim 1 wherein the leveling device has a covering to minimize thermal gradients and temperature variations.

14. An azimuth determination system in accordance with claim 1 wherein the electronics system comprises:
- a power supply may be used to power components of the system; and
- a computer system to collect and analyze data from the gyros and to send commands to the control device to move the platform to the desired position indicated by the leveling device.

15. An azimuth determination system in accordance with claim 14 wherein the electronics system further comprises an Uninterruptable Power Supply (UPS).

16. An azimuth determination system comprising:
- a rotary table;
- a platform;
- a heat exchanger positioned between the platform and the rotary table;
- proximity electronics attached to the platform;
- a plurality of gimbals attached to the platform to allow the platform to rotate about multiple axes;
- a pair of gryos attached to the platform;
- at least one heating device positioned on each gyro to control a temperature of each gyro;
- a plurality of end caps, wherein one end cap is placed on each end of each gyro with heating devices for thermal control;
- a trunnion heating device placed on each platform gimbal trunnion;
- a leveling device attached to the platform to indicate when the platform is at a desired position, wherein the leveling device has a covering to minimize thermal gradients and temperature variations.

17. An azimuth determination system in accordance with claim 16 wherein the heat exchanger comprises:
- a first set of disks;
- a second set of disks, wherein the first set of disks and the second set of disks are mounted alternately between an inner hub and an outer hub.

18. An azimuth determination system in accordance with claim 16 wherein the electronics system comprises:
- a power supply may be used to power components of the system; and
- a computer system to collect and analyze data from the gyros and to send commands to the control device to move the platform to the desired position indicated by the leveling device.

19. A gyrocompassing method to calculate azimuth free of gyro induced bias error comprising:
- positioning a pair of gyros in a first position with an input axis of the gyros orthogonal to the Earth Rate vector to calculate a first output;
- rotating the gyros 180° about the vertical to a second position to calculate a second output; and
- a control device attached to the plurality of gimbals to move the platform to the desired position indicated by the leveling device, wherein the control device comprises:
  - a first motor to bring an inner gimbal of the plurality of gimbals to a desired position; and
  - a second motor to move the platform to the desired position indicated by the leveling device; and
- an electronics system to provide power to the azimuth determination system and to determine azimuth by positioning the gyros in a first position with an input axis of the gyros in the horizontal plane and orthogonal to the Earth Rate vector to calculate a first output and rotating the gyros 180° about the vertical to a second position to calculate a second output, the platform is inverted and an additional set of two readings is taken, wherein the four outputs are combined to produce the azimuth value and a gyro induced bias error;
- calculating the azimuth, the azimuth equal to $\text{Sine}^{-1}(\text{First Output} - \text{Second Output})/2\omega_{ie\text{-}h}$, wherein $\omega_{ie\text{-}h}$ is the horizontal component of earth rate.

20. A gyrocompassing method to calculate azimuth free of gyro induced bias error in accordance with claim 19 further comprising:
- relating the azimuth angle using an autocollimator by determining an angle to a reference mirror on an instrument mount, with the first output and the second output calculated with the gyros in the first position and the second position; and
- transferring the angle to the reference mirror using a pentareflector.

* * * * *